United States Patent [19]

Stucki et al.

[11] Patent Number: 4,956,057
[45] Date of Patent: Sep. 11, 1990

[54] PROCESS FOR COMPLETE REMOVAL OF NITRITES AND NITRATES FROM AN AQUEOUS SOLUTION

[75] Inventors: Samuel Stucki, Nussbaumen, Switzerland; Dieter Winkler, Lauchringen, Fed. Rep. of Germany

[73] Assignee: Asea Brown Boveri Ltd., Baden, Switzerland

[21] Appl. No.: 420,954

[22] Filed: Oct. 13, 1989

[30] Foreign Application Priority Data

Oct. 21, 1988 [CH] Switzerland ................ 3927/88

[51] Int. Cl.$^5$ .............................................. C25B 1/00
[52] U.S. Cl. ................................. 204/101; 204/102; 204/128; 204/129; 204/130; 423/235; 423/242; 423/385; 423/239; 210/903
[58] Field of Search ............... 204/101, 102, 128, 129, 204/130; 423/235, 242, 385, 239; 210/903

[56] References Cited

U.S. PATENT DOCUMENTS

| | | | |
|---|---|---|---|
| 3,994,790 | 11/1976 | Inoue ................................. | 204/101 |
| 4,312,722 | 1/1982 | Yoshida ............................ | 204/292 |
| 4,397,719 | 8/1983 | Yoshida ............................ | 204/91 |
| 4,427,503 | 1/1984 | Heilgeist ........................... | 204/101 |
| 4,571,329 | 2/1986 | Kato et al. ........................ | 423/239 |

Primary Examiner—John F. Niebling
Assistant Examiner—David G. Ryser
Attorney, Agent, or Firm—Oblon, Spivak, McClelland, Maier & Neustadt

[57] ABSTRACT

A process for complete removal of nitrites and nitrates from an aqueous solution (1) by means of electrolysis, wherein the aqueous solution (1) is fed to the cathode space (4) of an electrolysis cell (2) and an aqueous solution (10), still containing only non-participating residual salts, is discharged from the anode space (6), whereas the gas (7) formed at the cathode is fed to a catalyst bed (8). In the latter, the gases $H_2$, $NH_3$, NO and $N_2O$ collected in the cathode space (4) are converted to the non-toxic substances $N_2$ and $H_2O$. In addition, partial combustion of $H_2$ by $O_2$ from the anode space (6) for maintaining the temperature of the catalyst bed (8).

3 Claims, 2 Drawing Sheets

PROCESS FOR COMPLETE REMOVAL OF NITRITES AND NITRATES FROM AN AQUEOUS SOLUTION

BACKGROUND OF THE INVENTION

1. Field of the Invention

Removal of harmful nitrogen compounds such as nitrites and nitrates from aqueous solutions and denitrification of flue gases and waste gases from thermal power installations by the wet-absorption process (scrubbing of nitrite and nitrate solutions).

The invention relates to the further treatment and processing of waters from denitrification and potable water treatment units, which are unsuitable for direct use or discharge into the effluent and have an inadmissibly high content of nitrogen salts. The effective removal of nitrites and nitrates is gaining increasing importance with regard to the question of solving environmental problems.

In particular, it relates to a process for complete removal of nitrites and nitrates from an aqueous solution by means of electrolysis.

2. Discussion of Background

In conjunction with the endeavors to improve the environment, to reduce air pollution and to protect surface waters, the removal and degradation of harmful nitrogen compounds are gaining importance. This applies in particular to the treatment and further processing of waters containing nitrites and nitrates. In the removal of nitric oxides from combustion waste gases by aqueous absorption or of nitrate from potable water by membrane processes, aqueous salt solutions are formed which contain nitrite and/or nitrate in a relatively high concentration. The arising of such solutions containing nitrite and/or nitrate calls increasingly for suitable solutions of the associated problems.

In the current state of the art, the wet absorption of nitric oxides from combustion waste gases is carried out by first oxidizing the NO to $NO_2$ in the gas phase by means of an oxidizing agent such as ozone, followed by absorption in an alkaline scrubbing solution. In this case, the absorbents must be fed continuously and the nitrate-containing scrubbing solution must be discharged.

It is known from the literature that, in the electrolysis of aqueous solutions containing nitrite and/or nitrate, NO, $N_2O$ and $NH_3$ are also formed in addition to hydrogen at the cathode. The composition of the cathode gas depends on the process conditions. It is also known that nitric oxides $NO_x$ can be catalytically converted by means of $NH_3$ or $H_2$ to $N_2$ and $H_2O$ and can thus be rendered harmless.

Regarding the state of the art, the following literature references are cited:

G. Kreysa, G. Breidenbach, K. J. Müller, Untersuchung zum Mechanismus und zur Katalyse der elektrochemischen Salpetersäure-reduktion [Study of the mechanism and catalysis in the electrochemical reduction of nitric acid], Ber. Bunsenges. Phys. Chem. 87, 66–71 (1983).

K. W. Lexow, Elektrolytische Reduktion von $NaNO_3$ in NaOH mit Raney-Nickel-Elektroden [Electrolytic reduction of $NaNO_3$ in NaOH with Raney nickel electrodes], Dechema Monographs 98, 229–244 (1985).

M. Schrod, J. Semel, R. Steiner, Verfahren zur Minderung von $NO_x$-Emissionen in Rauchgasen [Processes for reducing $NO_x$ emissions in flue gases], Chem.-Ing.-Tech. 57 (1985) No. 9, pages 717–727.

The known processes by themselves no longer satisfy the current requirements. There is therefore a demand for further developing and perfecting them.

SUMMARY OF THE INVENTION

Accordingly, one object of this invention is to provide a novel process for complete removal of nitrites and nitrates from an aqueous solution and conversion thereof to harmless substances, which is to be effected by a suitable electrolytic process. The process should be easy and inexpensive to carry out and be equally suitable for the regeneration of aqueous absorption solutions, containing nitrite and/or nitrate, from nitric oxide absorption units.

In the process mentioned at the outset, this object is achieved by feeding the aqueous solution, loaded with salts, nitrites and nitrates, to the cathode space of an electrolysis cell and passing the gas, formed by electrolytic reduction at the cathode and containing $H_2$, $NH_3$, NO and $N_2O$, through a catalyst bed for reaction, producing in this way the non-toxic substances $N_2$ and $H_2O$ as the reaction product, and taking off the aqueous solution, still containing non-participating residual salts, from the anode space.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
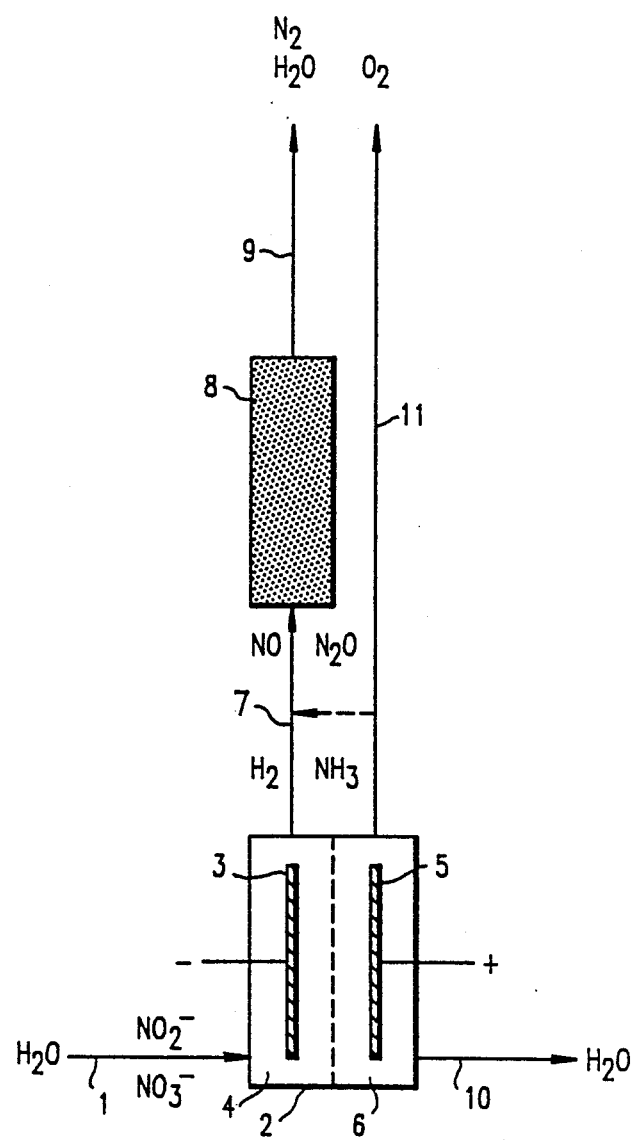
FIG. 1 shows a diagrammatic illustration of a simplified device for carrying out the process.

Referring now to the drawings, wherein like reference numerals designate identical or corresponding parts throughout the several views, FIG. 1 diagrammatically shows a simplified device for carrying out the process. 1 is the aqueous solution loaded with nitrites and nitrates (liquid feed). The harmful salts are reproduced by the symbols $NO_2^-$ and $NO_3^-$. 2 is an electrolysis cell, the polarities of which are marked by the symbols 31 and +. 3 is the cathode, 4 is the cathode space, 5 is the anode and 6 is the anode space. The cathode space 4 and anode space 6 are separated by a diaphragm. 7 represents the gas which is formed at the cathode 3, is collected in the cathode space 4 and discharged and which, in addition to $H_2$, also contains the gas $NH_3$ and the nitric oxides NO as well as $N_2O$. 8 is a catalyst bed for accelerating the chemical reactions, and 9 indicates the gaseous reaction products $N_2$ and $H_2O$ flowing out. 10 represents the aqueous solutions with the residual salts not participating in the reactions (liquid discharge), 11 is the gas which is formed at the anode 5, is collected in the anode space 6 and discharged and which consists virtually of $O_2$. A part of the $O_2$ is used for the combustion of a part of the $H_2$ collected in the cathode space 4, in order to bring the gas 7 upstream of and in the catalyst bed 8 to the reaction temperature (indicated by a horizontal dotted line with an arrow head).

Figure 2:
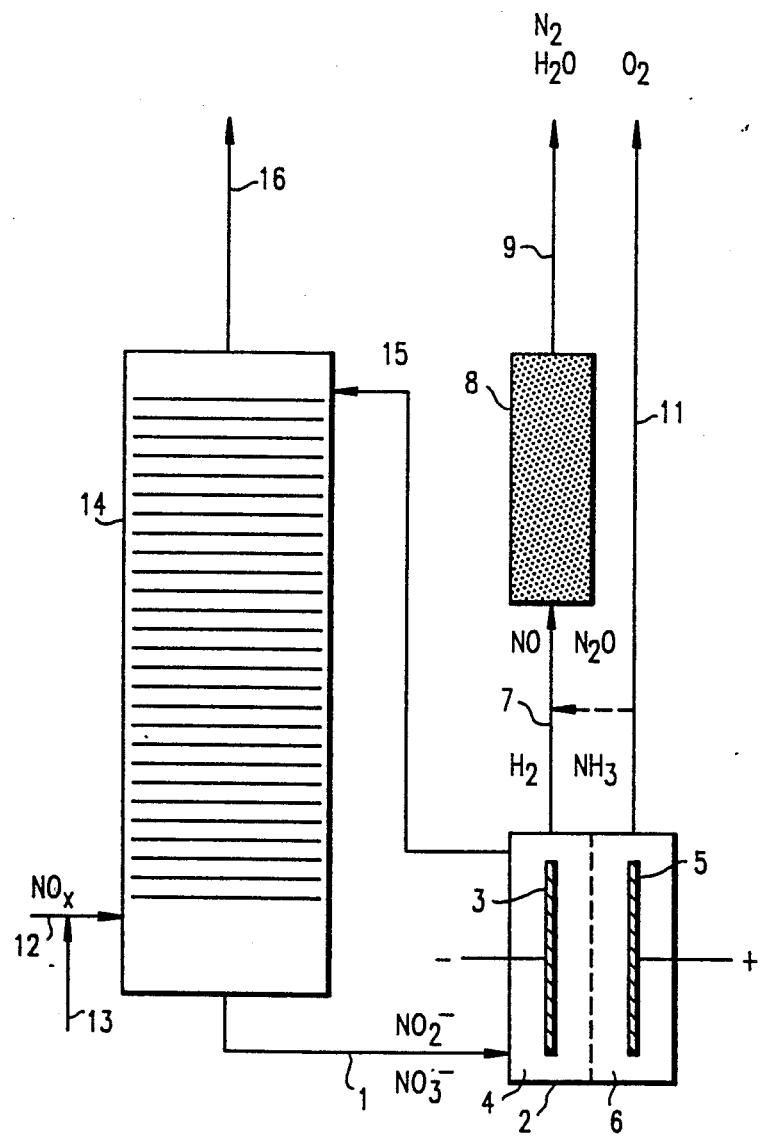
FIG. 2 shows a diagrammatic illustration of a unit for the denitrification of combustion gases, with recycle of the regenerated absorption solution.

FIG. 2 relates to a unit for the denitrification of combustion gases with recycle of the regenerated absorption solution, in a diagrammatic illustration. 12 is the $NO_x$-rich crude waste gas which is supplied, for example, from a thermal power installation. It is mixed with a gaseous oxidizing agent (ozone $O_3$) 13, NO being oxidized to $NO_2$. The $NO_2$-containing waste gas passes into the absorption vessel 14, where it is reacted in counter-current with an alkaline absorption solution. At least a part of the $NO_2$ is removed here in the form of an aqueous solution 1 of nitrite and nitrate (symbols $H_2O$; $NO_2^-$; $NO_3^-$) from the crude waste gas (wet scrubbing). The purified waste gas 16, depleted of $NO_x$, leaves the absorption vessel 14 upwards. The aqueous solution 1 is fed to the cathode space 4 of the electrolysis cell 2. The nitrites and nitrates as well as a part of the water are decomposed at the cathode 3, $H_2$, $NH_3$, NO and $N_2O$ being formed (reference symbol 7). These gases are reacted in the catalyst bed 8, the harmless substances $N_2$ and $H_2O$, which may escape into the environment, being formed as the reaction products 9. A part of the gas ($O_2$) 11 formed at the anode 5 is utilized, preferably at start-up, for partial combustion and heating of the gas 7. 15 is the alkaline absorption solution which is recycled from the cathode space 4 and introduced into the upper part of the absorption vessel 14. This absorption solution 15 contains the absorbents NaOH or KOH and still has a small content of nitrite ions and nitrate ions ($NO_2^-$; $NO_3^-$).

ILLUSTRATIVE EXAMPLE 1

See FIG. 1:

The device for the removal of nitrites and nitrates was connected to a production plant, from which an effluent rate of 10 m³/h at a nitrate content of 0.1 mol/l was obtained as a solution 1. Consequently, it was not permissible to pass the effluent directly to a treatment plant. The nitrate had to be removed from it first. For this purpose, the aqueous solution 1 was passed through an electrolysis cell 2, in which it was fed to the cathode space 4. The cell voltage was 3 V, the total operating current was 160 kA and the electric power was thus 480 kW. The gas 7 formed at the cathode 3 and consisting of a mixture of $H_2$, $NH_3$, NO and $N_2O$ was obtained at the rate of about 50 m³(S.T.P.)/hour (14 /l second). For raising the temperature, a small part of the gas ($O_2$) 11 formed at the anode 5 was added. The gases were reacted in a catalyst bed 8 and converted to a harmless mixture of $N_2$ and $H_2O$ vapor. In principle, this involved the following reactions:

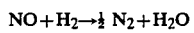

$NO + H_2 \rightarrow \frac{1}{2} N_2 + H_2O$

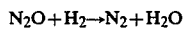

$N_2O + H_2 \rightarrow N_2 + H_2O$

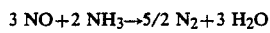

$3 NO + 2 NH_3 \rightarrow 5/2 N_2 + 3 H_2O$

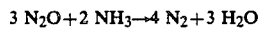

$3 N_2O + 2 NH_3 \rightarrow 4 N_2 + 3 H_2O$

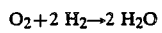

$O_2 + 2 H_2 \rightarrow 2 H_2O$

The aqueous solution 10 freed of nitrates and still containing small quantities of non-participating residual salts was passed to the effluent treatment plant.

ILLUSTRATIVE EXAMPLE 2

See FIG. 2:

A device for the denitrification of flue gases was connected downstream of a thermal power installation. The furnace operated with natural gas had a thermal output of 100 MW. 100,000 m³(S.T.P.)/hour of $NO_x$-rich crude waste gas 12 having a concentration of nitric oxides $NO_x$ of 200 ppm, relative to the volume, were obtained here. This corresponded to an $NO_x$ rate of about 20 m³(S.T.P.)/hour (5.58 /l second). The nitric oxides consisted to the extent of about 80% of NO and 20% of $NO_2$. Since NO is not absorbed in alkaline absorption solution 15, a gaseous oxidizing agent 13 in the form of ozone $O_3$ was admixed to the crude waste gas 12, whereby the NO was oxidized to $NO_2$. The waste gas then flowed through the absorption vessel 14, where more than 50% of the $NO_2$ were absorbed by an alkaline absorbent (NaOH in the present case). The aqueous solution 1, thus formed and loaded with nitrites and nitrates, was introduced into an electrolysis cell 2 similar to that in Example 1. The nitrites and nitrates were here reduced at the cathode 3 to NO, $N_2O$ and $NH_3$. In addition, $H_2$ was also evolved at the cathode 3. The electrolysis cell 2 was operated at a voltage of 3 V and a current of 75 kA. The electric power was 225 kW. The gas 7, formed at the cathode 3, at a rate of 20 m³(S.T.P.)/hour (5.55 /l second) left the cathode space 4 and was passed through a catalyst bed 8. The operating temperature of the catalyst bed 8 was maintained at about 350° C. In addition, a small quantity of the gas ($O_2$) generated at the anode 5 was also utilized for partial combustion of $H_2$. In the catalyst bed 8, the gases were converted to $N_2$ and $H_2O$ vapor in accordance with Example 1. The absorption solution 15 still containing small residual quantities of nitrites and nitrates was recycled from the cathode space 4 of the electrolysis cell into the upper part of the absorption vessel 14. A closed absorbent circulation was thus established which—apart from slight leakage losses—did not require any additions of fresh absorbent The invention is not restricted to the illustrative examples.

In principle, the process is carried out by feeding the aqueous solution 1, loaded with salts, nitrites and nitrates, to the cathode space 4 of an electrolysis cell 2 and passing the gas 7, formed by electrolytic reduction at the cathode 3 and containing $H_2$, $NH_3$, NO and $N_2O$, through a catalyst bed 8 for reaction, producing in this way the non-toxic substances $N_2$ and $H_2O$ as the reaction product, and taking off the aqueous solution 10, still containing non-participating residual salts, from the anode space 6. In an advantageous manner, the procedure is such that, at start-up, a small quantity of gas 11, which is formed at the anode 5 and which is taken in the form of oxygen from the anode space 6 of the electrolysis cell 2, is added to the gas formed at the cathode 3, and that the gas mixture is thus brought to the requisite reaction temperature in the catalyst bed 8.

The process serves equally for complete removal of nitrites and nitrates from the aqueous solution of a wet-absorption unit for a crude $NO_x$-rich waste gas 12 containing nitric oxide, the absorbent used being an aqueous alkaline solution 15 of NaOH or KOH, and the scrubbing solution 1, loaded with nitrites and nitrates, as the rich solution being fed to the cathode space 4 of an electrolysis cell 2 and being freed at least partially from the nitrites and nitrates and being recycled as a lean solution to the wet-absorption vessel 14 for $NO_2$, and the gases, formed by electrolytic reduction at the cathode 3, being catalytically reacted with one another to form $N_2$ and $H_2O$.

The advantages of the process are:

An optimum combination of an electrochemical reduction with a gas-phase reduction and accordingly a small expenditure on equipment.

Only the media which have in fact to be reacted with one another, without additional ballast gases or inert gases, flow through the catalyst bed which can therefore be kept small.

Simple controllability of the reaction temperature in the catalyst bed by controlled additional combustion of cathodically generated hydrogen with anodically generated oxygen.

Complete nitric oxide wet scrubbing, not requiring continuous feeding of absorbents, by recycling the absorption solution in the case of flue gas denitrification. The only utility consumed is electric power.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by letters patent of the United States is:

1. A process for complete removal of nitrites and nitrates from an aqueous solution (1) by means of electrolysis, which comprises: providing an electrolysis cell (2) containing a cathode, a cathode space, an anode, and an anode space; feeding the aqueous solution (1), loaded with salts, nitrites, and nitrates, to the cathode space (4) of the electrolysis cell (2); electrolytically producing gas at the anode and the cathode; passing the gas (7), formed by electrolytic reduction at the cathode (3) and containing $H_2$, $NH_3$, NO and $N_2O$, through a catalyst bed (8) for reaction, producing in this way the non-toxic substances $N_2$ and $H_2O$ as the reaction products (9); and taking off the aqueous solution (10), still containing non-participating residual salts, from the anode space (6).

2. The process as claimed in claim 1, which comprises forming a gas mixture by adding to the gas formed at the cathode (3) a small quantity of gas (11) which is formed at the anode (5) and which is taken in the form of oxygen from the anode space (6) of the electrolysis cell (2), and thus bringing the gas mixture to a predetermined reaction temperature in the catalyst bed (8).

3. A process for the removal of nitrites and nitrates from an aqueous solution of a wet-absorption vessel for a crude $NO_x$-rich waste gas (12) containing nitric oxide, the aqueous solution used being an aqueous alkaline solution (15) of NaOH or KOH, which comprises: providing an electrolysis cell containing a cathode, a cathode space, an anode, and an anode space feeding; the aqueous solution (1), loaded with nitrites and nitrates, as a rich solution to the cathode space (4) of the electrolysis cell (2); electrolytically freeing the aqueous solution at least partially from the nitrites and nitrates electrolytically producing gas at the cathode; recycling the aqueous solution as a lean solution to the wet-absorption vessel (14) for $NO_2$; and catalytically reacting the gas, formed by electrolytic reduction at the cathode (3), with one another to form $N_2$ and $H_2O$.

* * * * *